United States Patent
Böld et al.

(10) Patent No.: US 9,150,110 B2
(45) Date of Patent: Oct. 6, 2015

(54) METHOD FOR DISTRIBUTING ENERGY IN AN ELECTRIC VEHICLE AND ELECTRIC VEHICLE

(75) Inventors: Martin Böld, Regensburg (DE); Joris Fokkelman, Tegernheim (DE); Karsten Hofmann, Pettendorf (DE); Akos Semsey, Regensburg (DE); Christoph Weigand, Regensburg (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 10 days.

(21) Appl. No.: 13/884,648

(22) PCT Filed: Nov. 9, 2011

(86) PCT No.: PCT/EP2011/069766
§ 371 (c)(1),
(2), (4) Date: May 10, 2013

(87) PCT Pub. No.: WO2012/062815
PCT Pub. Date: May 18, 2012

(65) Prior Publication Data
US 2013/0238180 A1  Sep. 12, 2013

(30) Foreign Application Priority Data
Nov. 10, 2010 (DE) .......... 10 2010 043 690

(51) Int. Cl.
*B60L 11/00* (2006.01)
*B60W 10/24* (2006.01)
(Continued)

(52) U.S. Cl.
CPC ............. *B60L 11/02* (2013.01); *B60H 1/004* (2013.01); *B60H 1/00278* (2013.01);
(Continued)

(58) Field of Classification Search
CPC .............. B60H 1/00278; B60H 1/004; B60H 1/00764; B60K 6/46; B60W 10/06; B60W 10/08; B60W 10/30; B60W 20/00; B60W 2510/244; B60W 2550/402; B60W 2560/02; B60W 2710/244; B60W 50/0097; G11B 11/00
USPC .......... 701/22, 83, 84, 70, 490; 903/930, 903; 180/65.1–65.8; 340/995.1, 995.19
See application file for complete search history.

(56) References Cited

U.S. PATENT DOCUMENTS

| | | | |
|---|---|---|---|
| 5,913,917 A * | 6/1999 | Murphy | 701/123 |
| 2004/0168454 A1* | 9/2004 | Iritani | 62/230 |

(Continued)

FOREIGN PATENT DOCUMENTS

| | | | | |
|---|---|---|---|---|
| EP | 0811757 A2 | 12/1997 | | B60H 1/00 |
| EP | 1129892 A1 | 9/2001 | | B60L 11/12 |

(Continued)

OTHER PUBLICATIONS

International Search Report and Written Opinion, Application No. PCT/EP2011/069766, 15 pages, Jan. 24, 2012.

*Primary Examiner* — Muhammed Shafi
(74) *Attorney, Agent, or Firm* — Slayden Grubert Beard PLLC

(57) ABSTRACT

A method is disclosed for distributing energy in an electric vehicle including at least one electric energy store and at least one conditioning module, which can be used to generate electric energy from fuel, as energy sources, wherein driving-related information, or information about a state of the electric vehicle, is recorded before driving, or when beginning to drive, the electric vehicle and, while driving, energy is distributed in the vehicle on the basis of the information.

17 Claims, 2 Drawing Sheets

(51) Int. Cl.
- *B60L 11/02* (2006.01)
- *B60H 1/00* (2006.01)
- *B60K 6/46* (2007.10)
- *B60L 1/00* (2006.01)
- *B60L 1/10* (2006.01)
- *B60L 11/12* (2006.01)
- *B60L 11/18* (2006.01)
- *B60W 10/06* (2006.01)
- *B60W 10/08* (2006.01)
- *B60W 10/30* (2006.01)
- *B60W 20/00* (2006.01)
- *B60W 50/00* (2006.01)

(52) U.S. Cl.
CPC ............ *B60H 1/00764* (2013.01); *B60K 6/46* (2013.01); *B60L 1/003* (2013.01); *B60L 1/10* (2013.01); *B60L 11/12* (2013.01); *B60L 11/126* (2013.01); *B60L 11/1838* (2013.01); *B60L 11/1887* (2013.01); *B60W 10/06* (2013.01); *B60W 10/08* (2013.01); *B60W 10/30* (2013.01); *B60W 20/00* (2013.01); *B60W 50/0097* (2013.01); *B60L 2240/60* (2013.01); *B60L 2240/642* (2013.01); *B60L 2240/66* (2013.01); *B60L 2240/72* (2013.01); *B60L 2250/10* (2013.01); *B60L 2250/18* (2013.01); *B60L 2260/52* (2013.01); *B60L 2260/54* (2013.01); *B60W 2510/244* (2013.01); *B60W 2550/402* (2013.01); *B60W 2560/02* (2013.01); *B60W 2710/244* (2013.01); *Y02T 10/6217* (2013.01); *Y02T 10/6269* (2013.01); *Y02T 10/6291* (2013.01); *Y02T 10/7077* (2013.01); *Y02T 10/7291* (2013.01); *Y02T 10/84* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/34* (2013.01)

(56) References Cited

U.S. PATENT DOCUMENTS

| | | | |
|---|---|---|---|
| 2008/0078542 A1 | 4/2008 | Gering et al. | 165/202 |
| 2008/0188997 A1* | 8/2008 | Egoshi | 701/1 |
| 2009/0215402 A1* | 8/2009 | Ng | 455/69 |
| 2010/0225276 A1* | 9/2010 | Sugiyama et al. | 320/118 |
| 2011/0060521 A1* | 3/2011 | Watkins | 701/213 |

FOREIGN PATENT DOCUMENTS

| | | | |
|---|---|---|---|
| EP | 2091127 A1 | 8/2009 | H02J 7/14 |
| GB | 2466081 A | 6/2010 | B60H 1/32 |
| WO | 2012/062815 A1 | 5/2012 | B60H 1/00 |

* cited by examiner

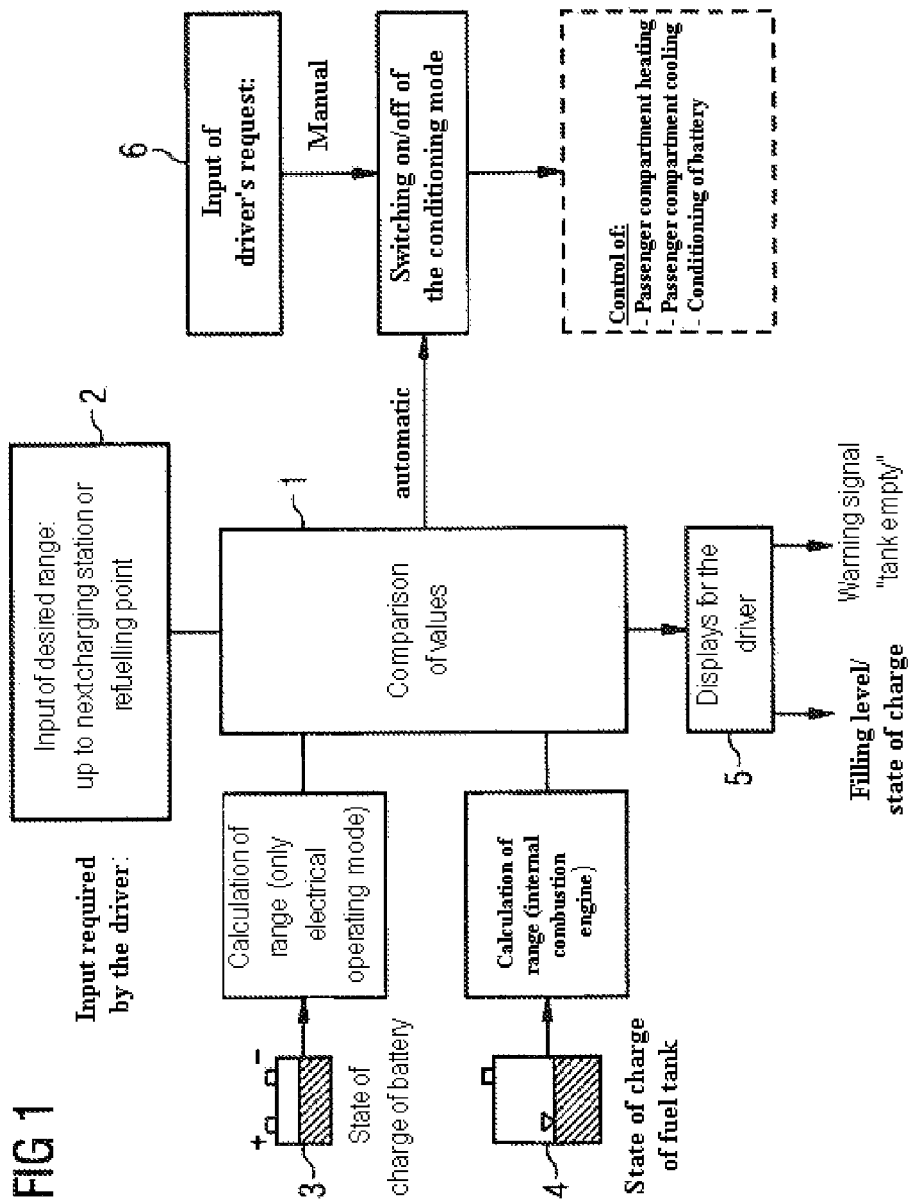

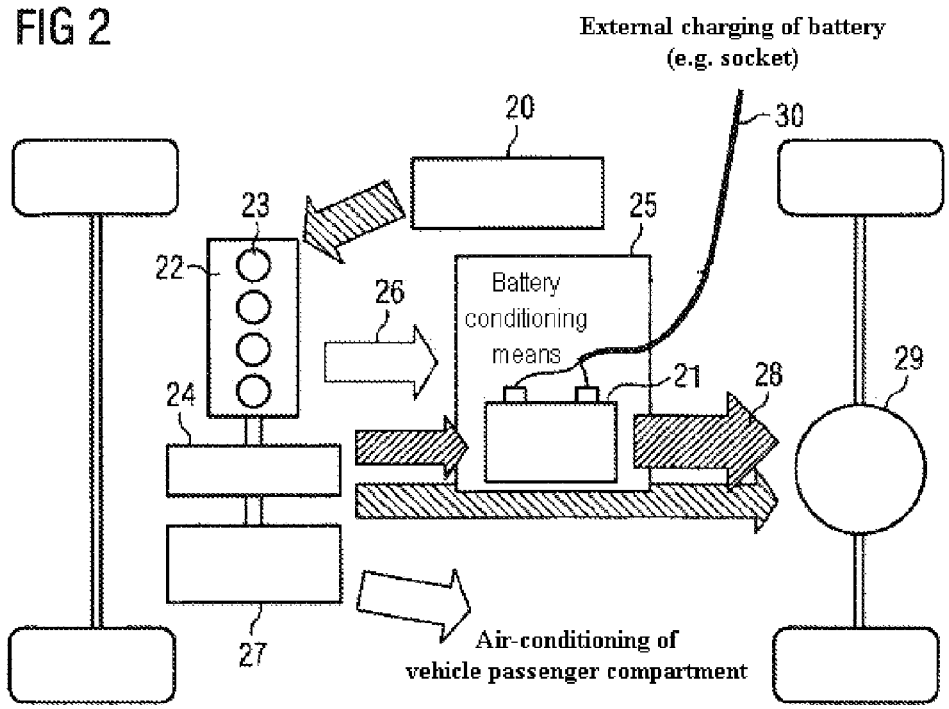

METHOD FOR DISTRIBUTING ENERGY IN AN ELECTRIC VEHICLE AND ELECTRIC VEHICLE

CROSS-REFERENCE TO RELATED APPLICATIONS

This application is a U.S. National Stage Application of International Application No. PCT/EP2011/069766 filed Nov. 9, 2011, which designates the United States of America, and claims priority to DE Application No. 10 2010 043 690.9 filed Nov. 10, 2010, the contents of which are hereby incorporated by reference in their entirety.

TECHNICAL FIELD

This disclosure relates to a method for distributing energy in an electric vehicle and to an electric vehicle in which the available energy can be correspondingly distributed.

BACKGROUND

Many vehicles in the future will be driven electrically, with a smaller or larger battery serving as the energy store. Until now, electrical means of transportation have been based on the use of large-volume batteries as energy stores. In this context, the size of the battery used plays a central role since it has a highly determining influence on the costs and on the entire weight of the vehicle. For this reason, the objective is to use a battery which is as small and lightweight as possible in order therefore to save weight, space and costs.

In order to be able to use the largest possible proportion of energy from the battery for the electric drive, the battery should as far as possible be kept at the temperature level which is optimum for it, regardless of the respective external temperature. Furthermore, controlling the temperature of the passenger compartment of the vehicle also requires electrical energy, which is then no longer available to drive the electric vehicle. Up to 50% of the drive energy is lost as a result of comfort functions such as air-conditioning in the summer and heating in the winter, and this significantly reduces the range of the electric vehicle.

Electric vehicles are in the development phase. Until now, in order to increase the range of electric vehicles, range extenders with a cubic capacity of at least 1000 to 1400 ccm have been proposed. The range extenders usually originate from engines for motor vehicles which have been previously available on the market and are therefore significantly larger than is actually necessary. As a result of their size, electric vehicles can reach an acceptable maximum speed and acceleration even when operating with a flat drive battery.

However, the large range extenders are very heavy and take up a lot of space in the vehicle. Relatively small range extenders have not been used until now since during operation with a flat drive battery they could only provide reduced driving performance (for example relatively low maximum speed and poor acceleration).

SUMMARY

One embodiment provides a method for distributing energy in an electric vehicle having, as energy sources, at least one electrical energy store and at least one conditioning module with which electrical energy can be generated from fuel, wherein, before or at the start of a journey with the electric vehicle, information about the journey or else about a state of the electric vehicle is recorded, and during the journey energy from at least one electrical energy store is distributed, on the basis of the information, to at least one drive machine of the vehicle, at least one passenger compartment air-conditioning device for air-conditioning a passenger compartment of the vehicle and/or at least one energy store air-conditioning device for air-conditioning the at least one electrical energy store, and is distributed from the at least one conditioning module to the at least one passenger compartment air-conditioning device, the at least one energy store air-conditioning device and/or the at least one electrical energy store.

In a further embodiment, at least some of the information or all of the information is recorded by inputting said information by means of an input device.

In a further embodiment, at least some of the information or all of the information is recorded by reading it in from a memory, a navigation device and/or an Internet access device.

In a further embodiment, the information is or contains a distance traveled during the journey, an altitude profile of the journey, a driver profile, environmental conditions, a state of charge of the at least one electrical energy store, a filling state of at least one fuel tank for supplying the conditioning module with fuel, information about the next refueling possibility, information about the next charging possibility and/or an operating mode of the conditioning module.

In a further embodiment, the information for at least one route section indicates a preferred energy source of the energy sources.

In a further embodiment, it is determined from the recorded information whether the respective energy sources can be used to make available a sufficient quantity of energy to carry out the journey completely, and in that a warning signal is generated if it becomes apparent here that the journey cannot be carried out completely or can only be carried out completely under different conditions.

In a further embodiment, the conditioning module has an internal combustion engine and an electric generator which can be driven therewith and/or has at least one fuel cell, wherein the internal combustion engine is preferably operated with fuel, gas, diesel or petrol.

In a further embodiment, the passenger compartment air-conditioning device and the energy store air-conditioning device are supplied with energy only from the at least one conditioning module, and/or in that the drive machine is supplied with energy only from the at least one electrical energy store.

In a further embodiment, a desired range is input, preferably by means of a selection switch, as information or as part of the information, wherein preferably at first an electric maximum range and/or a maximum range are/is calculated and are/is predefined for input, and the desired range is input between zero and the calculated maximum range or the maximum range.

In a further embodiment, when the desired range is greater than the electrical maximum range, energy from the at least one conditioning module is fed to the drive machine and/or the at least one electrical energy store.

In a further embodiment, a currently remaining range is indicated to a user before and/or during the journey.

Another embodiment provides an electric vehicle having: at least one drive machine, at least one electrical energy store, at least one conditioning module with which electrical energy can be generated from fuel, at least one information-recording device with which information about an imminent journey of the vehicle can be recorded, and at least one energy distribution device with which during a journey energy from at least one electrical energy store can be distributed, on the basis of the information, to at least one drive machine of the vehicle, at least one passenger compartment air-conditioning device for air-conditioning a passenger compartment of the vehicle and/or at least one energy store air-conditioning device for air-conditioning the at least one electrical energy store, and can be distributed from the at least one conditioning module to the at least one passenger compartment air-conditioning device, the at least one energy store air-conditioning device and/or the at least one electrical energy store.

In a further embodiment, the electric vehicle includes a switch for switching the conditioning module on and off.

In a further embodiment, during the journey the energy can be distributed in a method as claimed in one of claims 1 to 11.

BRIEF DESCRIPTION OF THE DRAWINGS

Exemplary embodiments will be explained in more detail below on the basis of the schematic drawings, wherein:

FIG. 1 illustrates an example method according to one embodiment, and

FIG. 2 shows an example electric vehicle according to one embodiment.

DETAILED DESCRIPTION

Embodiments of the present disclosure provide a method with which the quantity of energy available to an electric vehicle can be distributed in such a way that it can be used in an optimum way for a given journey. The intention is also to specify a corresponding vehicle.

Some embodiments provide a method for distributing energy in an electric vehicle is specified. In this context, the method is carried out in an electric vehicle which has, as energy sources, at least one electrical energy store and at least one conditioning module with which electrical energy can be generated from fuel, and at least one drive machine.

In some embodiments, the energy is distributed as electrical energy, i.e. a current is supplied to the corresponding consumers in accordance with the envisaged distribution. Distribution of power is also equivalent to the distribution of the energy, and said distribution of power can be correspondingly controlled.

The at least one energy store may be, for example, an accumulator, a battery, a fuel cell or some other galvanic cell.

The at least one conditioning module may have an internal combustion engine and an electric generator, wherein the internal combustion engine drives the electric generator. Therefore, electrical energy can preferably also be provided using the conditioning module. The conditioning module can generally also be considered to be an electric generator.

In some embodiments, before the start of the journey or at the start of a journey, that is to say, for example, before the engine starts or before the vehicle first drives off, information about the journey is now recorded. In addition, information about a state of the vehicle can also be recorded, for example measured. The information is preferably recorded by means of a suitable device of the electric vehicle.

This information can be, inter alia, the distance to be traveled during the journey, a desired range, a length of the section of the journey up to the next charging point or refueling point, an altitude profile of the journey, a driver profile, environmental conditions of the journey, a filling state of the fuel container which supplies the conditioning module with fuel, a state of charge of the at least one electrical energy store and/or an operating mode of the conditioning module. It is possible to record the information as a function of the travel time during the journey and/or as a function of a distance traveled during the journey.

In one embodiment of the method, the information can be recorded completely or partially by inputting said information by means of an input device, such as for example a keyboard, a mouse, a joystick, a touch screen and/or a track pad. Alternatively or additionally, some of the information can also be recorded by reading it in from a memory, a navigation device or from a server by means of an Internet access device.

It is also possible to record at least some of the information by means of measurements. In this way, in particular information which relates to the vehicle can be recorded, for example the filling level of the specified tank or the state of charge of the electrical energy store.

In one embodiment, just a desired range is specified by means of an input device. Other information, in particular the filling level of the specified tank and the state of charge of the electrical energy store, can be measured automatically. It is then advantageously possible to determine a maximum possible range from the measured variables and then provide a user with the possibility of selecting desired ranges between zero and the maximum possible range by means of the input device.

On the one hand, the electrical minimum range, which is the range which the vehicle can travel solely on the basis of the charge of the electrical energy store, but also the maximum range, which is the range which is possible for the vehicle using the entire available energy, i.e. the energy of the electrical energy store and the electrical energy which can be generated by means of the conditioning module, on the basis of the available fuel content, can be predefined as ranges which can be set by the user. If the desired range is greater than the electrical range, the conditioning module can be used to recharge the electrical energy store.

In one embodiment, it is possible to determine from the recorded information whether the energy which can be generated with the energy sources which are present is sufficient to carry out a desired journey, and a warning signal can be output, for example as a signaling sound or as a visual signal, if it becomes apparent from the information about the journey that the planned journey is not possible with the energy available from the electrical energy store or is not possible with the total energy from the electrical energy store and the conditioning module or is completely possible only under different conditions.

If the energy distribution is performed over the achievable range, a safety margin is preferably taken into account in the achievable range in order to compensate for possible inaccuracies, for example as a result of the travel profile, environmental influences and/or measurement inaccuracies.

In some embodiments, during the journey the energy or power from the at least one electrical energy store is now distributed to the at least one drive machine of the vehicle, at least one passenger compartment air-conditioning device for air-conditioning the passenger compartment of the vehicle and/or at least one energy store air-conditioning device for air-conditioning the at least one electrical energy store. Furthermore, energy from at least one conditioning module is distributed to the at least one electrical energy store, the at least one passenger compartment air-conditioning device and/or the at least one energy store air-conditioning device.

It is therefore possible to distribute the energy from the at least one electrical energy store between the drive machine of the vehicle, the passenger compartment air-conditioning device and/or the energy store air-conditioning device. The energy provided by the conditioning module can be distributed to the at least one passenger compartment air-conditioning device, the at least one energy store air-conditioning device and, in addition, also to the at least one electrical energy store.

In the simplest case, the electric vehicle therefore has an electrical energy store and a drive machine, wherein the drive machine is supplied with electrical energy from the electrical energy store. On the basis of the given information, the electrical energy store is supplied with energy from the at least one conditioning module, with the result that a desired journey can be carried out. In this context, the supply of energy by the conditioning module can be regulated in accordance with the recorded information. If the conditioning module has an internal combustion engine, it is, for example, possible, depending on the conditions of the journey or of the route, to supply the electrical energy store with energy by means of the conditioning module only on one partial section or a plurality of partial sections of the total route, and not to operate the conditioning module on at least one partial section which is subject, for example, to specific noise protection requirements or emission requirements.

The vehicle may also have at least one of the specified air-conditioning devices for air-conditioning the passenger compartment of the vehicle and/or the electrical energy store. Such air-conditioning devices can be heaters and/or cooling devices such as, for example, air-conditioning systems.

In this context, it is then possible to control, on the basis of the information, how much energy is provided by the electrical energy store to operate the air-conditioning devices and how much energy is provided to operate the air-conditioning devices by the conditioning module. It is also possible here, as described above, to take into account conditions of the journey or of the route traveled during the journey.

The energy from the at least one electrical energy store and the at least one conditioning module can advantageously be distributed in accordance with the recorded information in such a way that the journey is optimized in terms of one or more of the following criteria.

On the one hand, the certainty of reaching the destination can be optimized, which destination can be selected, in particular, with respect to whether the electrical energy store or a fuel tank for the conditioning module can be recharged or refilled there. The energy distribution can also be optimized to the best possible efficiency of the total drive system.

Electrical energy from the power system may be used because as a result the environmental friendliness of the vehicle is improved.

The energy can be distributed in such a way that an "emergency operating mode" in which the electrical energy store is completely discharged and the conditioning module makes available the total energy for the movement of the vehicle is avoided. In the emergency operating mode, only a very reduced power level and therefore reduced maximum speed and relatively low acceleration are available (for example at maximum 50 km/h at approximately 10 kW power by the conditioning module).

In some embodiments, the conditioning module can be made significantly smaller than would be necessary if it had to supply all of the power to move the vehicle. The conditioning module is advantageously dimensioned in such a way that it can supply at least the power requirement for heating, ventilation and/or cooling. As a result, the conditioning module can be configured so that it is just able alone to supply the comfort functions with energy.

In a further embodiment, the maximum power of the conditioning module corresponds to the average driving power of the vehicle. In this way, an emergency operating mode can be ensured by means of the conditioning module.

The maximum power which can be provided by means of the conditioning module is advantageously $\geq 4$ kW, particularly preferably $\geq 6$ kW and/or $\leq 12$ kW, particularly preferably $\leq 10$ kW.

By means of a conditioning module which is dimensioned in such a way, it is possible to ensure the comfort functions described above as well as an emergency operating mode for an average standard vehicle without additional insulating measures.

It is possible in some embodiments to distribute the energy in such a way that the passenger compartment air-conditioning device which is possibly present and/or the energy store air-conditioning device which is possibly present is supplied with energy only from the conditioning module or to the greatest possible extent from the conditioning module and/or the drive machine is supplied with energy only from the electrical energy store or to the greatest possible extent from the electrical energy store. This makes it possible to ensure that the air-conditioning devices do not adversely affect the driving performance of the vehicle.

In one embodiment, the currently remaining range and/or the state of charge of the electrical energy store and/or the filling state of the fuel tank is indicated to the driver before and/or during the journey, particularly preferably regularly or continuously.

Other embodiments provide an electric vehicle having at least one drive machine, at least one electrical energy store, at least one conditioning module with which electrical energy can be generated from fuel, and at least one information-recording device with which information about an imminent journey of the vehicle can be recorded. The vehicle also has at least one energy distribution device with which energy from the at least one energy store and the at least one conditioning module can be distributed as described above.

The vehicle may also have at least one passenger compartment air-conditioning device for air-conditioning a passenger compartment of the vehicle and/or an energy store air-conditioning device for air-conditioning the at least one electrical energy store.

The electric vehicle can also have devices with which the range can be displayed and/or which output a warning signal when the tank is empty or the electrical energy store is flat. The range display is therefore also advantageous because, as a result of the conditioning of the electrical energy store and the air-conditioning, energy is also used from the subordinate energy source and the driver of the vehicle should also keep an eye on this source.

In addition the conditioning module of the vehicle may be used to directly generate current. If necessary, it is therefore advantageously possible to switch the conditioning module on or off with a switch. In this way, it is possible, for example, to switch on the conditioning module for the APU mode for the power requirement on a camp site or to switch it off to travel through areas which are sensitive in terms of emissions or noise.

As already described above, information may be obtained via a specific interface or mobile navigation systems. Against the background that navigation in the future will also be obtained as a service from the Internet, for example by means of an iPhone, it is therefore also possible to include service provider information for controlling the conditioning module. For example, the conditioning module could then switch itself off in indicated areas which are, for example, prone to noise or emissions and the fact that the vehicle is traveling through such areas could be taken into account in the described energy distribution.

Some embodiments may provide a significant increase in comfort for the driver when operating an electric vehicle, in particular as a result of the additional equipment with the conditioning module. By virtue of the suitable distribution of the energy, the vehicle is prevented from having to be operated in an emergency running phase even over relatively large distances.

As a result of the inputting of a target range, the size of the conditioning module for the electric vehicle can be reduced. The vehicle can therefore be operated in a way which is optimized in terms of weight and cost, without restricting driving properties of the electric vehicle. The range of the electric vehicle is increased without additional batteries being required for this purpose. This can provide a saving in terms of costs, space and weight and can lower the consumption by the vehicle. The risk is also reduced of the electric vehicle becoming stranded because of a flat battery and therefore having to drive on in the emergency operating mode.

FIG. 1 schematically shows the execution of the method in an electric vehicle according to one embodiment. In this context, a central computing unit 1 processes a desired range which can be input by a driver of the vehicle via an input device 2. This can be, for example, the distance to be traveled up to the next charging station or refueling point. The central computing unit 1 also processes the state of charge of a battery 3 as an electrical energy store and the filling level of a fuel tank 4 with which a conditioning module which makes available electrical energy can be driven. An electrical range and/or a total range can then be calculated from the states of charge of the battery 3 and of the fuel tank 4. The central computing unit 1 can also generate displays 5 for the driver which inform him about the filling level of the tank 4 and/or the state of charge of the battery 3 and can generate a warning signal if the battery is becoming flat and/or the tank is becoming empty or a desired range is exceeding the electrical range or the total range.

The central computing unit 1 can also distribute the energy available from the battery 3 and the conditioning module. In this context, the energy of the battery 3 is, for example, distributed to the drive machine of the vehicle, a passenger compartment temperature-control device, for example an air-conditioning system or heating system, and/or a battery temperature-control device for controlling the temperature of the electrical energy store. The energy which is generated by the conditioning module can be distributed to the passenger compartment temperature-control device, the energy store temperature-control device and to the battery 3.

The central computing unit 1 can also record further information about the planned journey such as, for example, the distance to be traveled, an altitude profile of the journey, a driver profile, environmental conditions, operating modes of the conditioning module and the like.

The distribution of the energy in the vehicle can be controlled in order, for example, to maximize the range, wherein conditions of the route can also be taken into account such as, for example, the need to avoid emissions or noise.

The conditioning module can be, for example, a fuel cell or can have an internal combustion engine and an electric generator which can be driven with the latter. It is possible to distribute the energy in such a way that the energy made available by the battery 3 is made available only to the drive machine or to the largest possible extent to the drive machine, and the energy provided by the conditioning module is made available only to the temperature-control devices or to the largest possible extent to the temperature-control devices.

By means of the input device 2, a desired range can be input by a user. It is also possible here to take into account the state of charge of the battery 3 and the filling level of the fuel tank and to predefine a maximum electrical total range or maximum total range to the user within which he can select the desired range. It is possible, in particular, to output a warning signal if the user selects a range which exceeds the possible range.

A further input can also be made by means of a switch 6 with which the conditioning module can be switched on and off. As a result, the conditioning module can be used as an independent energy producer or, if appropriate, switched off if this should be necessary in order to avoid noise and emissions, for example.

As an example, a vehicle will be cited which has an electromotor and a conditioning module, wherein the conditioning module can also be used to extend the range. At the start of a journey with the electric vehicle, neither the timetable nor the intention of the driver is known to the vehicle. It is also not known when and where the vehicle will be refueled, parked or recharged. This information does not have to be present in a navigation device either. The driver can then have the option of setting the planned length of the route before the start of the journey, for example by means of a rotary knob.

If the driver predefines a short route for the journey, the vehicle can be operated purely electrically. If he enters a medium route length, the vehicle travels partially with support by the conditioning module depending on the state of charge of the battery, wherein the energy distribution is controlled automatically. If the driver predefines a long route for the journey, the conditioning module can be activated early so that as much additional electrical energy as possible can already be provided by the conditioning module during the purely electric journey, in order to travel as far as possible without an emergency operating mode. For this purpose, the conditioning module can, for example, charge the battery.

As a result, the available energy can be distributed and utilized in an optimum way using the range indication, wherein electrical energy can be used with priority on short routes and the emergency operating mode can be avoided in the case of relatively long routes.

FIG. 2 shows an electric vehicle in which the disclosed method can be carried out, according to an example embodiment. The vehicle has two energy sources, a fuel tank 20 and a battery 21. Fuel can be supplied to a conditioning module 22 by means of the fuel tank 20. The conditioning module 22 has in this context an internal combustion engine 23 and a generator 24 with which electrical energy can be generated. The electrical energy which is generated by the generator 24 can be supplied to the battery 21. Furthermore, a battery conditioning means 25, with which the temperature of the battery 21 can be controlled, can be driven by the internal combustion engine 23, and thermal energy 26 can be supplied. The battery conditioning means 25 can also be suitable for cooling the battery 21. The cooling device can be supplied with electrical energy here by means of the generator 24 and/or the battery 21. The internal combustion engine 23 of the conditioning module can also drive a compressor 27 of an air-conditioning device or of an HVAC (heating, ventilating and air-conditioning) device. By means of this compressor 27 it is possible, for example, to air-condition a passenger compartment of a vehicle. The battery 21 can also be air-conditioned by means of this compressor 27. In addition to a direct drive of the compressor 27, it is also possible to drive the compressor 27 by means of electrical energy which is provided by the conditioning module 22 and/or the battery 21. Finally, electrical energy 28 can be supplied from the battery 21 to the electric motor or electric drive 29.

In order to charge the battery 21 in the stationary state of the vehicle, the battery 21 can also be supplied with electrical energy from the outside by means of a terminal 30.

LIST OF REFERENCE NUMBERS

1 Central computing unit
2 Input device
3 Battery
4 Fuel tank
5 Display
20 Fuel tank
21 Battery
22 Conditioning module
23 Internal combustion engine
24 Generator
25 Battery conditioning means
26 Thermal energy
27 Compressor
28 Electrical energy
29 Electric drive
30 Battery terminal

What is claimed is:

1. A method for distributing energy in an electric vehicle having, as energy sources, at least one electrical energy store and at least one conditioning module with which electrical energy can be generated from fuel, the method comprises:
   before or at the start of a journey with the electric vehicle, recording information regarding the journey or regarding a state of the electric vehicle;
   during the journey:
      distributing energy from at least one electrical energy store, based on the recorded information, to at least one of: at least one drive machine of the vehicle, at least one passenger compartment air-conditioning device for air-conditioning a passenger compartment of the vehicle, and at least one energy store air-conditioning device for air-conditioning the at least one electrical energy store, and
      distributing energy from the at least one conditioning module to at least one of: the at least one passenger compartment air-conditioning device, the at least one energy store air-conditioning device, and the at least one electrical energy store.

2. The method of claim 1, wherein at least some of the information is recorded by inputting said information via an input device.

3. The method of claim 1, wherein at least some of the information is recorded by reading it in from at least one of a memory, a navigation device, and an Internet access device.

4. The method of claim 1, wherein the information comprises at least one of a distance traveled during the journey, an altitude profile of the journey, a driver profile, environmental conditions, a state of charge of the at least one electrical energy store, a filling state of at least one fuel tank for supplying the conditioning module with fuel, information about the next refueling possibility, information about the next charging possibility, and an operating mode of the conditioning module.

5. The method of claim 1, wherein the information for at least one route section indicates a preferred energy source of the energy sources.

6. The method of claim 1, comprising:
   determining based on the recorded information whether the respective energy sources are able to provide a sufficient quantity of energy to complete the journey under defined conditions, and
   generating a warning signal if it is determined that the respective energy sources are unable to provide a sufficient quantity of energy to complete the journey under defined conditions.

7. The method of claim 1, wherein the conditioning module has an internal combustion engine and an electric generator, and wherein the internal combustion engine is operated with fuel, gas, diesel, or petrol.

8. The method of claim 1, wherein the passenger compartment air-conditioning device and the energy store air-conditioning device are supplied with energy only from the at least one conditioning module, and the drive machine is supplied with energy only from the at least one electrical energy store.

9. The method of claim 1, comprising:
   calculating at least one of an electric maximum range and a maximum range,
   inputting a desired range via a selection switch, wherein the desired range is between zero and the calculated electric maximum range or maximum range.

10. The method of claim 9, wherein when the desired range is greater than the electrical maximum range, energy from the at least one conditioning module is fed to the drive machine or the at least one electrical energy store.

11. The method of claim 1, comprising indicating a currently remaining range to a user before or during the journey.

12. An electric vehicle comprising:
   at least one drive machine,
   at least one electrical energy store,
   at least one conditioning module configured for generating electrical energy from fuel,
   at least one information-recording device configured to record information about an imminent journey of the vehicle, and
   at least one energy distribution device comprising a processor and computer-readable instructions stored in a non-transitory storage medium of the electric vehicle and executable by the processor to, during a journey:
      distribute energy from at least one electrical energy store, based on the information, to at least one of: at least one drive machine of the vehicle, at least one passenger compartment air-conditioning device for air-conditioning a passenger compartment of the vehicle, and at least one energy store air-conditioning device for air-conditioning the at least one electrical energy store, and
      distribute energy from the at least one conditioning module to at least one of: the at least one passenger compartment air-conditioning device, the at least one energy store air-conditioning device, and the at least one electrical energy store.

13. The electric vehicle of claim 12, comprising a switch configured to switch the conditioning module on and off.

14. The electric vehicle of claim 12, wherein at least some of the information is recorded by inputting said information via an input device.

15. The electric vehicle of claim 12, wherein the information comprises at least one of a distance traveled during the journey, an altitude profile of the journey, a driver profile, environmental conditions, a state of charge of the at least one electrical energy store, a filling state of at least one fuel tank for supplying the conditioning module with fuel, information about the next refueling possibility, information about the next charging possibility, and an operating mode of the conditioning module.

16. The electric vehicle of claim 12, wherein the information for at least one route section indicates a preferred energy source of the energy sources.

17. The electric vehicle of claim 12, wherein the at least one energy distribution device is configured to
- determine based on the recorded information whether the respective energy sources are able to provide a sufficient quantity of energy to complete the journey under defined conditions, and
- generate a warning signal if it is determined that the respective energy sources are unable to provide a sufficient quantity of energy to complete the journey under defined conditions.

* * * * *